(12) United States Patent
Kimura et al.

(10) Patent No.: US 11,221,074 B2
(45) Date of Patent: Jan. 11, 2022

(54) MECHANICAL SEAL (71) Applicant: EAGLE INDUSTRY CO., LTD., Tokyo (JP)

(72) Inventors: Tadahiro Kimura, Tokyo (JP); Hikaru Katori, Tokyo (JP); Masatoshi Itadani, Tokyo (JP); Takeshi Hosoe, Tokyo (JP); Yasuhiro Ikeda, Tokyo (JP); Tomoko Yamaki, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/647,838

(22) PCT Filed: Sep. 19, 2018

(86) PCT No.: PCT/JP2018/034533
§ 371 (c)(1),
(2) Date: Mar. 16, 2020

(87) PCT Pub. No.: WO2019/059197
PCT Pub. Date: Mar. 28, 2019

(65) Prior Publication Data
US 2020/0278029 A1 Sep. 3, 2020

(30) Foreign Application Priority Data
Sep. 20, 2017 (JP) .............................. JP2017-180691

(51) Int. Cl.
*F16J 15/34* (2006.01)
*F16J 15/38* (2006.01)
(52) U.S. Cl.
CPC ....... *F16J 15/3436* (2013.01); *F16J 15/3464* (2013.01); *F16J 15/38* (2013.01)

(58) Field of Classification Search
CPC .... F16J 15/3436; F16J 15/344; F16J 15/3464; F16J 15/38
See application file for complete search history.

(56) References Cited

U.S. PATENT DOCUMENTS 3,675,935 A * 7/1972 Ludwig .................. F16J 15/342
277/400
3,782,737 A * 1/1974 Ludwig .................. F16J 15/342
277/400

(Continued)

FOREIGN PATENT DOCUMENTS

GB         850296 A  * 10/1960  ............... F16J 15/38
JP        S61206168 U   12/1986
(Continued)

OTHER PUBLICATIONS

International Search Report (ISR) dated Nov. 6, 2018, issued for International application No. PCT/JP2018/034533. (1 page).

*Primary Examiner* — Nicholas L Foster
(74) *Attorney, Agent, or Firm* — Law Office of Katsuhiro Arai (57) ABSTRACT

The purpose of the present invention is to provide a mechanical seal in which a stationary-side sealing ring can follow the movement of a rotating-side sealing ring to provide reliable sealing properties and by which the entire device can be made compact.

A mechanical seal in which a rotating-side sealing ring 13 attached to a shaft 2 and a stationary-side sealing ring 21 attached to a housing 3 slide relative to each other and seal between the housing 3 and the shaft 2 includes a case 22 which is attached to the housing 3 and which contains the stationary-side sealing ring 21, and a seal member 23 which is disposed between the case 22 and the stationary-side sealing ring 21, and the case 22 includes a holding part 22*d*

(Continued)

which regulates the seal member 23 from moving to both sides in the axial direction thereof.

14 Claims, 4 Drawing Sheets

(56) References Cited

U.S. PATENT DOCUMENTS

| | | | | |
|---|---|---|---|---|
| 3,806,136 | A * | 4/1974 | Warner | F16J 15/38 |
| | | | | 277/373 |
| 5,692,756 | A * | 12/1997 | Altieri | F16J 15/3464 |
| | | | | 277/353 |
| 5,899,460 | A * | 5/1999 | Altieri | F16J 15/3496 |
| | | | | 277/352 |
| 10,054,230 | B2 * | 8/2018 | Katori | F16J 15/3416 |
| 10,337,560 | B2 * | 7/2019 | Tokunaga | F16J 15/348 |
| 10,337,620 | B2 * | 7/2019 | Tokunaga | F16J 15/3412 |
| 10,473,220 | B2 * | 11/2019 | Tokunaga | F16C 33/107 |
| 10,598,286 | B2 * | 3/2020 | Tokunaga | F16J 15/3412 |
| 10,612,665 | B2 * | 4/2020 | Itadani | F16J 15/34 |
| 10,704,417 | B2 * | 7/2020 | Tokunaga | F16J 15/34 |
| 11,009,072 | B2 * | 5/2021 | Kimura | F16J 15/3412 |
| 2018/0073394 | A1 * | 3/2018 | Tokunaga | F02C 7/06 |
| 2018/0128377 | A1 * | 5/2018 | Tokunaga | F16J 15/34 |
| 2018/0128378 | A1 * | 5/2018 | Tokunaga | F16J 15/3412 |
| 2018/0135699 | A1 * | 5/2018 | Tokunaga | F16C 33/80 |
| 2018/0172162 | A1 * | 6/2018 | Tokunaga | F16J 15/3412 |
| 2018/0306327 | A1 * | 10/2018 | Itadani | F16J 15/348 |
| 2019/0203840 | A1 * | 7/2019 | Katori | F16J 15/342 |
| 2019/0376558 | A1 * | 12/2019 | Kimura | F16C 17/045 |
| 2021/0003221 | A1 * | 1/2021 | Kimura | F16J 15/34 |

FOREIGN PATENT DOCUMENTS

| | | |
|---|---|---|
| JP | H0542281 Y1 | 10/1993 |
| JP | H08334174 A | 12/1996 |
| JP | 2005207520 A | 8/2005 |

* cited by examiner

MECHANICAL SEAL

CROSS-REFERENCE TO RELATED APPLICATIONS

This application is the U.S. National Phase under 35 U.S.C. § 371 of International Application PCT/JP2018/034533, filed Sep. 19, 2018, which claims priority to Japanese Patent Application No. JP2017-180691, filed Sep. 20, 2017. The International Application was published under PCT Article 21(2) in a language other than English.

TECHNICAL FIELD

The present invention relates to a mechanical seal in which a rotating-side sealing ring attached in a sealed state to a shaft and a stationary-side sealing ring attached in a sealed state to a housing slide relative to each other, and seal between the housing and the shaft.

BACKGROUND ART

Conventionally, there is a mechanical seal in which a mating ring attached in a sealed state to a rotating shaft and a seal ring attached in a sealed state to a housing slide relative to each other, and seal between the housing and the rotating shaft, the mechanical seal including an annular case which is fixed to the housing and which contains the seal ring, and an O-ring disposed between the seal ring and the annular case (for example, see Patent Document 1).

Moreover, there is a mechanical seal device in which a rotating-side sealing ring attached in a sealed state to a shaft and a stationary-side sealing ring attached to a seal housing slide relative to each other, and seal between the seal housing and the shaft, the mechanical seal device including a cartridge which is fixed to the seal housing and which contains the stationary-side sealing ring, and a rubber bellows disposed between the stationary-side sealing ring and the cartridge (for example, see Patent Document 2).

CITATION LIST

Patent Documents

Patent Document 1: JP H05-42281 Y (FIG. 1)
Patent Document 2: JP 2005-207520 A (pp. 6, 7, and FIG. 1)

SUMMARY OF THE INVENTION

Problem to be Solved by the Invention

However, in Patent Document 1, the O-ring which seals between the seal ring and the annular case contacts the seal ring at two points of an inner circumferential surface and an end surface thereof. Therefore, when shaft vibration is increased, the seal ring is restrained by the O-ring due to their contact at two points of the inner circumferential surface and the end surface, and therefore, cannot sufficiently follow the movement of the mating ring, and there is a risk that reliable sealing properties cannot be provided.

Moreover, in Patent Document 2, flexibility is ensured by increasing the axial length of the rubber bellows, so the stationary-side sealing ring can follow the movement of the rotating-side sealing ring even if shaft vibration is increased. However, the axial length of the bellows is increased, so there is a problem that the mechanical seal device is increased in size.

The present invention has been made in view of such problems, and an object thereof is to provide a mechanical seal in which a stationary-side sealing ring can follow the movement of a rotating-side sealing ring to provide reliable sealing properties and by which the entire device can be made compact.

Means for Solving Problem

To solve the above problems, a mechanical seal according to a first aspect of the present invention is a mechanical seal in which a rotating-side sealing ring attached in a sealed state to a shaft and a stationary-side sealing ring attached in a sealed state to a housing slide relative to each other and seal between the housing and the shaft, and the mechanical seal is characterized in that:

the mechanical seal includes a case which is attached to the housing and which contains the stationary-side sealing ring, and a seal member which is disposed between the case and the stationary-side sealing ring; and the case includes a holding part which regulates the seal member from moving to both sides in the axial direction thereof.

According to the first aspect, the seal member is regulated by the holding part of the case from moving to the both sides in the axial direction thereof, so the seal member can contact the stationary-side sealing ring at one point and seal it. Thereby, the stationary-side sealing ring is not restrained by the seal member from moving and can follow the movement of the rotating-side sealing ring to provide reliable sealing properties.

The mechanical seal according to a second aspect of the present invention is characterized in that the holding part further includes an axial gap between the seal member and itself.

According to the second aspect, even if the seal member deforms and swells in the axial direction, deformation can be absorbed by the axial gap.

The mechanical seal according to a third aspect of the present invention is characterized in that the holding part consists of an annular groove.

According to the third aspect, the seal member is reliably held over almost the whole circumference thereof by the holding part consisting of the annular groove.

The mechanical seal according to a fourth aspect of the present invention is characterized in that a depth of the holding part is larger than a gap between the stationary-side sealing ring and the case.

According to the fourth aspect, the depth of the annular groove is larger than the gap between the stationary-side sealing ring and the case, so the seal member is reliably held without protruding from the gap between the stationary-side sealing ring and the case.

The mechanical seal according to a fifth aspect of the present invention is characterized in that a cross-sectional shape of the holding part is a trapezoidal shape which is narrow on an inner diameter side and is wide on an outer diameter side.

According to the fifth aspect, the seal member is regulated from moving to the both sides in the axial direction within the trapezoidal groove, and the annular groove is narrow on the inner diameter side and is wide on the outer diameter side, so even if the seal member deforms and swells in the axial direction, deformation can be absorbed by the axial gap on the outer diameter side.

The mechanical seal according to a sixth aspect of the present invention is characterized in that:

the stationary-side sealing ring includes an inner circumferential portion formed into same diameter along almost the entire axial length; and the seal member contacts the inner circumferential portion.

According to the sixth aspect, the mechanical seal can be made compact, and an inner circumferential surface of the stationary-side sealing ring is formed into the same diameter along almost the entire axial length, so even if a mold-release material such as SiC is used, molding is facilitated, and stabilization of quality and reduction of cost are possible.

BRIEF DESCRIPTION OF THE DRAWINGS

FIG. 3A is a vertical cross-sectional view of a case before a seal member is attached thereto, and FIG. 3B is a vertical cross-sectional view of the case in a state that the seal member is fitted thereto and fitting claws are bent.

FIG. 4A shows a case where an X-ring is used as the seal member, FIG. 4B shows a case where a U-ring is used as the seal member, and FIG. 4C shows a case where a combination seal is used as the seal member.

DESCRIPTION OF EMBODIMENTS

Embodiments of a sliding component according to the present invention will be described in detail referring to the drawings. In addition, a mechanical seal to be described below is an example, the present invention shall not be interpreted as being limited thereto, and a variety of changes, amendments, or improvements could be added based on the knowledge of a person skilled in the art without departing from the scope of the present invention.

First Embodiment

A sliding component according to a first embodiment of the present invention will be described referring to FIG. 1.

Figure 1:
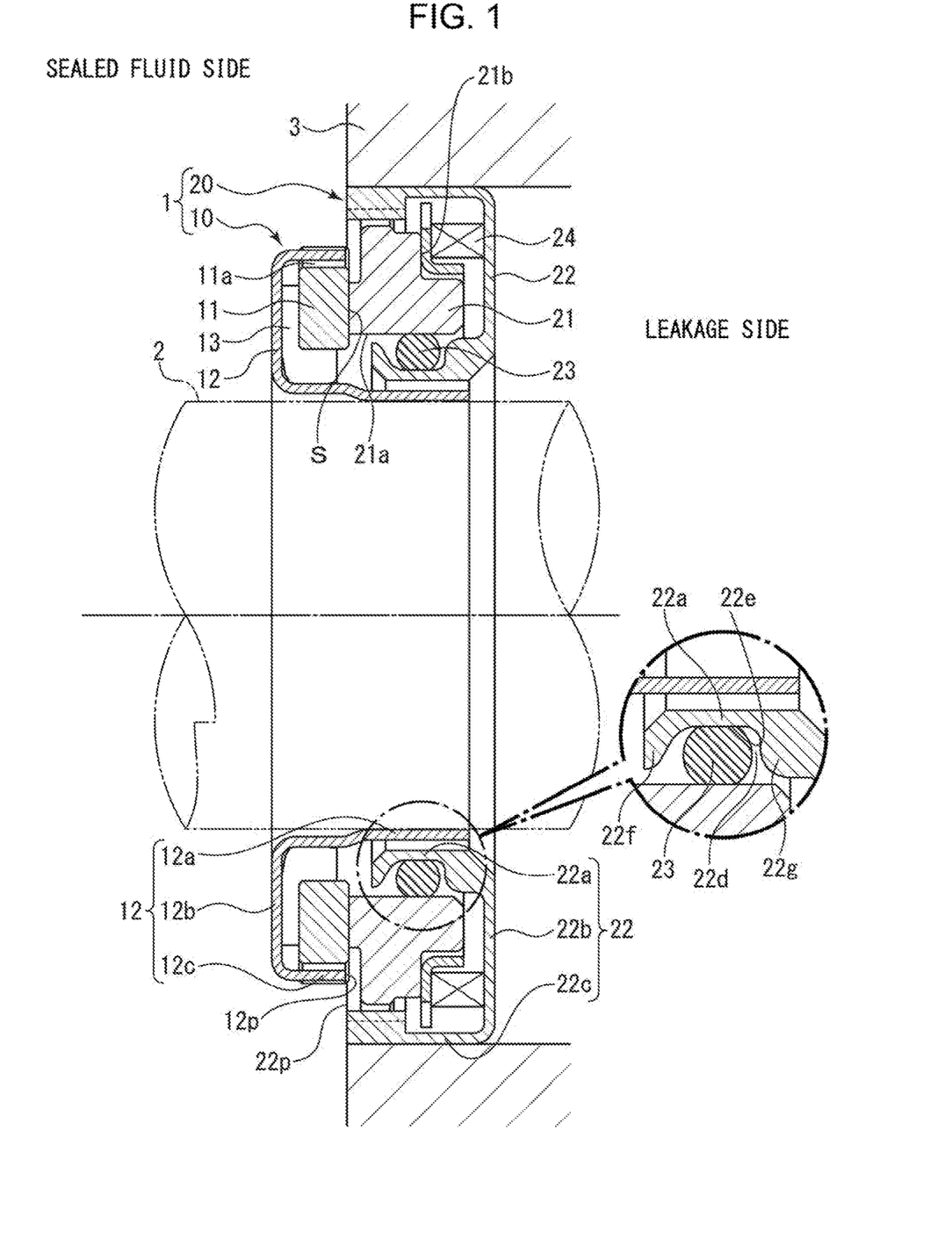
FIG. 1 is a vertical cross-sectional view showing an example of a mechanical seal according to a first embodiment.

FIG. 1 is a vertical cross-sectional view showing an example of a mechanical seal 1, which is an inside mechanical seal in a form of sealing a fluid to be sealed tending to leak from the outer circumference of a sliding face S toward the inner circumference. The mechanical seal 1 consists of a rotating-side cartridge 10 provided in a state of being integrally rotatable with a rotating shaft 2, and a stationary-side cartridge 20 fixed to a housing 3 in a state of being non-rotatable. The rotating-side cartridge 10 includes a sleeve 12 fixed to the rotating shaft 2, and a rotating-side sealing ring 11 provided in a state of being integrally rotatable with the rotating shaft 2 via a cup gasket 13 within the sleeve 12. On the other hand, the stationary-side cartridge 20 includes a case 22 fixed to the housing 3, a circular-ring shaped stationary-side sealing ring 21 provided in a state of being non-rotatable and axially movable within the case 22, a seal member 23 provided between the case 22 and the stationary-side sealing ring 21, and a biasing means 24 which axially biases the stationary-side sealing ring 21. The rotating-side sealing ring 11 and the stationary-side sealing ring 21 slide relative to each other on a sliding face S, thereby preventing a fluid to be sealed from flowing out from the outer circumference to a leakage side. In addition, although the materials of the rotating-side sealing ring 11 and the stationary-side sealing ring 21 are selected from silicon carbide (SiC) excellent in wear resistance, carbon excellent in self-lubricity and the like, for example, both may be SiC or combinations of SiC as one of them and carbon as the other of them are possible. Hereinafter, the configurations of the rotating-side cartridge 10 and the stationary-side cartridge 20 will be described.

The rotating-side cartridge 10 mainly consists of the sleeve 12 fixed to the rotating shaft 2, and the cup gasket 13 and the rotating-side sealing ring 11 which rotate with the sleeve 12.

As shown in FIG. 1, the sleeve 12 is an annular member having a generally U-shaped cross-section, and consists of an inner cylinder part 12a press-fitted and fixed to the rotating shaft 2, an end wall 12b extended from one end of the inner cylinder part 12a to the radially outside, and an outer cylinder part 12c extended from an outer diameter side end part of the end wall 12b to the axial direction on the inner cylinder part 12a side. An opening 12p of the sleeve 12 is fixed to the rotating shaft 2 so as to face the stationary-side cartridge 20.

As shown in FIG. 1, the rotating-side sealing ring 11 is formed by an annular member having a generally rectangular cross-section. On the front surface side of the rotating-side sealing ring 11 opposed to the stationary-side sealing ring 21, the sliding face S is provided. In addition, in order to be able to correspond to even the case where the rotation centers of the rotating-side sealing ring 11 and the stationary-side sealing ring 21 do not exactly match, a sealing portion margin on the outer diameter side and a sealing portion margin on the inner diameter side are formed by increasing the outer diameter of the sliding face S and decreasing the inner diameter thereof, and the sliding face S of the rotating-side sealing ring 11 is formed larger than the radial width of the sliding face S of the stationary-side sealing ring 21 to be described later. Moreover, in the present embodiment, the radial width of the sliding face S of the rotating-side sealing ring 11 is formed larger than the radial width of the sliding face S of the stationary-side sealing ring 21, but the present invention is not limited thereto, and of course can be applied to the opposite case. Further, a notch recess 11a is formed in the outer circumferential portion of the rotating-side sealing ring 11 symmetrically to the rotating shaft 2 as shown in FIG. 1, the aforementioned sleeve 12 is engaged with the notch recess 11a, and the rotating-side sealing ring 11 and the sleeve 12 rotate integrally.

Further, as shown in FIG. 1, the cup gasket 13 is an annular member having an L-shaped cross-section and is made up of an elastic body such as rubber. To the cup gasket 13, an appropriate interference is given between the rotating-side sealing ring 11 and the inner cylinder part 12a of the sleeve 12, and sealing performance and a fixed power are ensured.

Then, the rotating-side sealing ring 11 is contained in an annular space 10a of the sleeve 12 so that the sliding face S faces the opening 12p of the sleeve 12, the back surface side and the inner circumferential side of the rotating-side sealing ring 11 are fixed to the sleeve 12 via the cup gasket 13, and thereby the rotating-side cartridge 10 is constituted.

Next, the stationary-side cartridge 20 will be described. The stationary-side cartridge 20 mainly consists of the case 22 fixed to the housing 3, the stationary-side sealing ring 21 contained in the case 22, the seal member 23 provided between the case 22 and the stationary-side sealing ring 21, and the biasing means 24 which biases the stationary-side sealing ring 21 toward the rotating-side sealing ring 11.

The stationary-side sealing ring 21 is formed by an annular member having a generally rectangular cross-section, and on the surface opposed to the rotating-side sealing ring 11, the sliding face S is formed. The sliding face S of the stationary-side sealing ring 21 is formed in an axially protruding annular part. A pressing surface 21b of the stationary-side sealing ring 21 is pressed by the biasing means 24 from the leakage side toward the rotating-side sealing ring 11, thereby a predetermined surface pressure is applied to the sliding face S.

The case 22 which contains the stationary-side sealing ring 21 is an annular member having a generally U-shaped cross-section, and is fixed to the housing 3 so that the opening 22p of the case 22 is opposed to the rotating-side sealing ring 11. The case 22 mainly consists of an outer cylinder part 22c press-fitted and fixed to the housing 3, an end wall 22b extended from one end of the outer cylinder part 22c to the radially inside, and an inner cylinder part 22a extended from an inner diameter side end part of the end wall 22b to the axial direction on the outer cylinder part 22c side. Moreover, on an outer circumferential surface of the inner cylinder part 22a, a holding part 22d for containing the seal member 23 is formed. The holding part 22d is an annular groove consisting of a bottom wall 22e, and a pair of annular wall parts 22f, 22g stood from the bottom wall 22e. Moreover, at least one of the wall parts 22f, 22g is opened and inclined toward the radially outside. The width of the holding part 22d for containing the seal member 23 is formed larger than the width of the seal member 23, and the depth of the holding part 22d is formed larger than a gap between an inner circumferential surface 21a (an inner circumferential portion according to the present invention) of the stationary-side sealing ring 21 and an outer diameter portion of the holding part 22d, that is, outer diameter portions of the wall parts 22f, 22g.

The seal member 23 held by the holding part 22d is compressively deformed in the radial direction between the inner circumferential surface 21a of the stationary-side sealing ring 21 and the case 22 and adhered to them, thereby sealing between the stationary-side sealing ring 21 and the case 22. Moreover, the seal member 23 is regulated at both sides in the axial direction thereof by the wall part 22f and the wall part 22g of the holding part 22d from axially moving, so the seal member 23 contacts the inner circumferential surface 21a of the stationary-side sealing ring 21 only at the outer diameter side thereof. Even if the rotating-side sealing ring 11 is largely displaced relative to the case 22, the seal member 23 and the inner circumferential surface 21a of the stationary-side sealing ring 21 contact with each other at only one point, so the stationary-side sealing ring 21 is not restrained by the seal member 23 from moving and can follow the movement of the rotating-side sealing ring 11 to provide reliable sealing properties. Moreover, the surface formed by radially extending the pressing surface 21b of the stationary-side sealing ring 21 is set so as to pass the seal member 23, so the biasing means 24 can efficiently correct the posture of the stationary-side sealing ring 21 with less biasing force.

Moreover, the width of the holding part 22d for containing the seal member 23 is formed larger than the width of the seal member 23, so the seal member 23 has an axial gap between the holding part 22d and itself, and can absorb axial swelling due to deformation of the seal member 23. Further, the depth of the holding part 22d is formed larger than the gap between the inner circumferential surface 21a of the stationary-side sealing ring 21 and the outer diameter portion of the holding part 22d, that is, the outer diameter portions of the wall parts 22f, 22g, so the seal member 23 can be prevented from protruding from the holding part 22d.

Further, the inner circumferential surface 21a of the stationary-side sealing ring 21 is formed into same diameter along almost the entire axial length, so the mechanical seal can be made compact. Moreover, the inner circumferential surface of the stationary-side sealing ring is formed into the same diameter, so even if a mold-release material such as SiC is used, molding is facilitated, and stabilization of quality and reduction of cost are possible.

Second Embodiment

Figure 2:
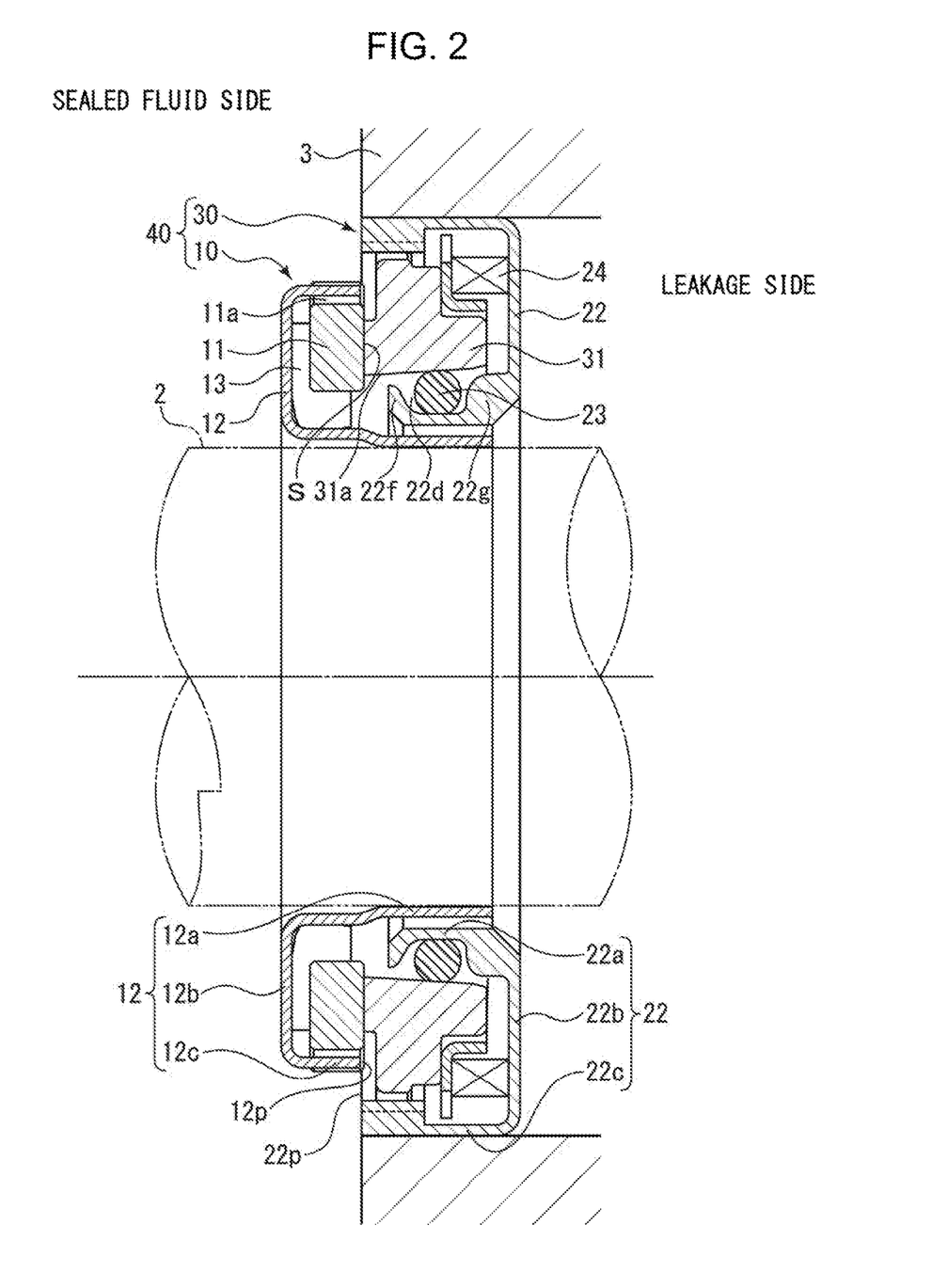
FIG. 2 is a vertical cross-sectional view showing an example of the mechanical seal according to a second embodiment.

The sliding component according to a second embodiment of the present invention will be described. FIG. 2 shows the sliding component according to the second embodiment, and the second embodiment is only different from the first embodiment in that an inner circumferential surface 31a of a stationary-side sealing ring 31 is a tapered surface, and other configurations are the same as those in the first embodiment. Hereinafter, the same members as those in the first embodiment are denoted by the same numerals and symbols, and redundant descriptions will be omitted.

As shown in FIG. 2, the inner circumferential surface 31a (the inner circumferential portion according to the present invention) of the stationary-side sealing ring 31 is a tapered surface. The inner circumferential surface 31a of the stationary-side sealing ring 31 is tapered and therefore can be easily fitted to the seal member 23 attached to the holding part 22d of the case 22, and it is possible to easily set the stationary-side sealing ring 31 in a predetermined position. The seal member 23 is compressively deformed in the radial direction between the inner circumferential surface 31a of the stationary-side sealing ring 31 and the case 22 and adhered to them, thereby sealing between the stationary-side sealing ring 31 and the case 22. Moreover, the seal member 23 is regulated at both sides in the axial direction thereof by the wall part 22f and the wall part 22g of the holding part 22d from axially moving, and contacts the inner circumferential surface 31a of the stationary-side sealing ring 31 only at the outer diameter side thereof. Thereby, even if the rotating-side sealing ring 11 is largely displaced relative to the case 22, the seal member 23 and the inner circumferential surface 31a of the stationary-side sealing ring 31 contact with each other at only one point, so the stationary-side sealing ring 31 is not restrained by the seal member 23 from moving and can follow the movement of the rotating-side sealing ring 11 to provide reliable sealing properties.

Third Embodiment

Figure 3:
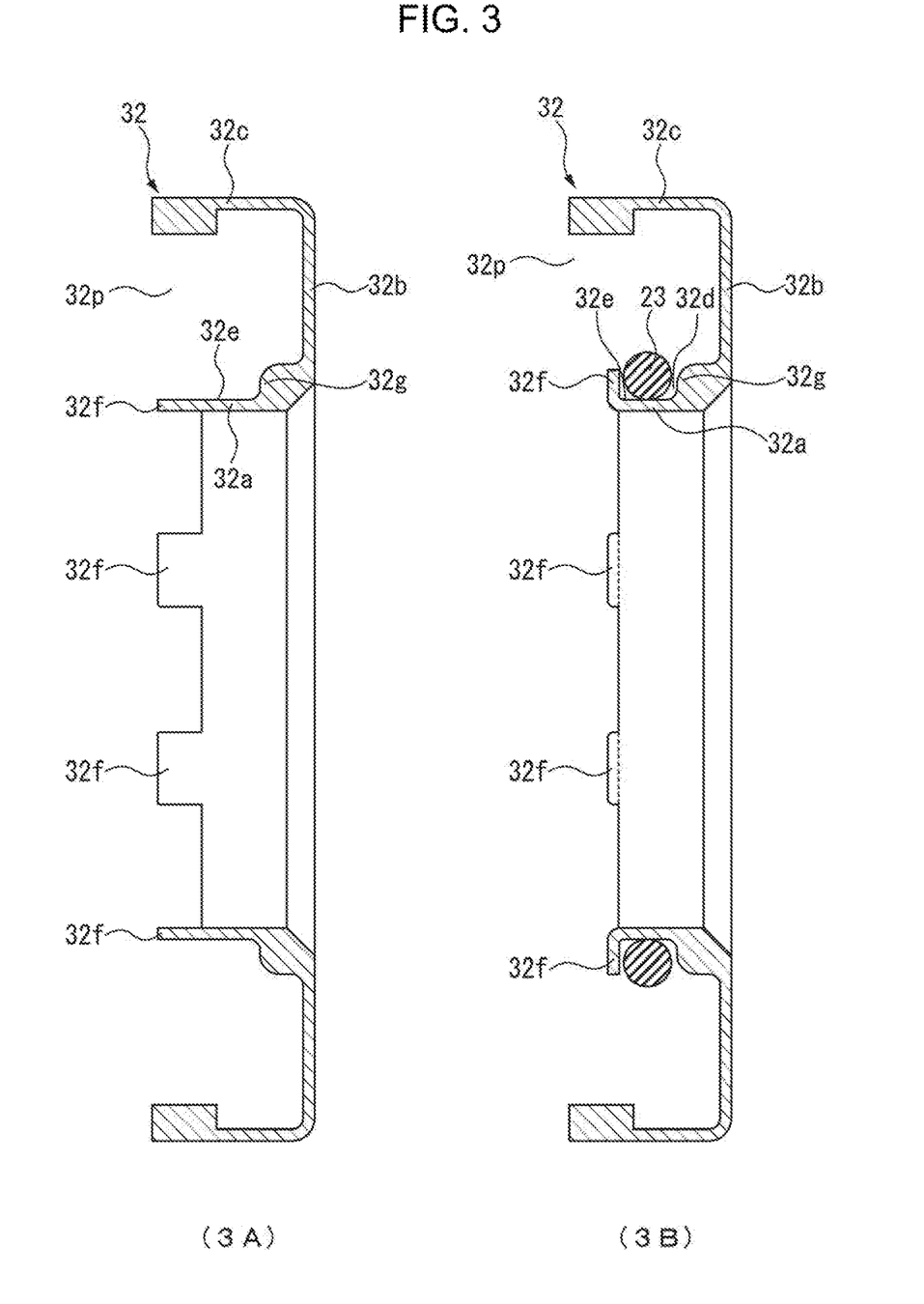
FIG. 3 is a vertical cross-sectional view showing an example of the mechanical seal according to a third embodiment.

The sliding component according to a third embodiment of the present invention will be described. FIG. 3 shows the sliding component according to the third embodiment, and the third embodiment is only different from the first and the second embodiments in the shape of a case 32 which contains the stationary-side sealing rings 21, 31, and other configurations are the same as those in the first and the second embodiments. Hereinafter, the same members as those in the first embodiment are denoted by the same numerals and symbols, and redundant descriptions will be omitted.

As shown in FIG. 3A, the case 32 which contains the stationary-side sealing ring 21 is an annular member having a generally U-shaped cross-section, and is fixed to the housing 3 so that an opening 32p of the case 32 is opposed to the rotating-side sealing ring 11. The case 32 mainly consists of an outer cylinder part 32c press-fitted and fixed to the housing 3, an end wall 32b extended from one end of the outer cylinder part 32c to the radially inside, and an inner cylinder part 32a extended from an inner diameter side end part of the end wall 32b to the axial direction on the outer cylinder part 32c side. Moreover, in the inner cylinder part 32a, a predetermined number (six in the embodiment of FIG. 3) of claw parts 32f are formed at the end part on the opening 32p side.

As shown in FIG. 3B, after the seal member 23 is attached to the outer circumferential surface of the inner cylinder part 32a, the claw parts 32f are bent so as to face the radial direction. Thereby, a holding part 32d consisting of a bottom wall 32e, an annular wall part 32g stood from the bottom wall 32e, and the claw part 32f is formed, and the seal member 23 is contained in the holding part 32d. The holding part 32d is formed by bending the claw part 32f after the seal member 23 is attached to the outer circumferential surface of the inner cylinder part 32a, so it is possible to easily attach the seal member 23 to the case 32, and it is possible to prevent damage of the seal member 23 when attached to the case 32.

Hereinbefore, although the embodiments of the present invention have been described by the drawings, its specific configuration is not limited to these embodiments, and any changes and additions made without departing from the scope of the present invention are included in the present invention.

For example, the above embodiments show the case where the rotating-side sealing ring 11 is disposed in the sleeve 12 and sealed by the cup gasket 13 as an example, but the present invention is not limited thereto. For example, without using the sleeve 12 and the cup gasket 13, the rotating-side sealing ring 11 may be sealed by providing a seal member between the rotating-side sealing ring 11 and the rotating shaft 2.

Figure 4:
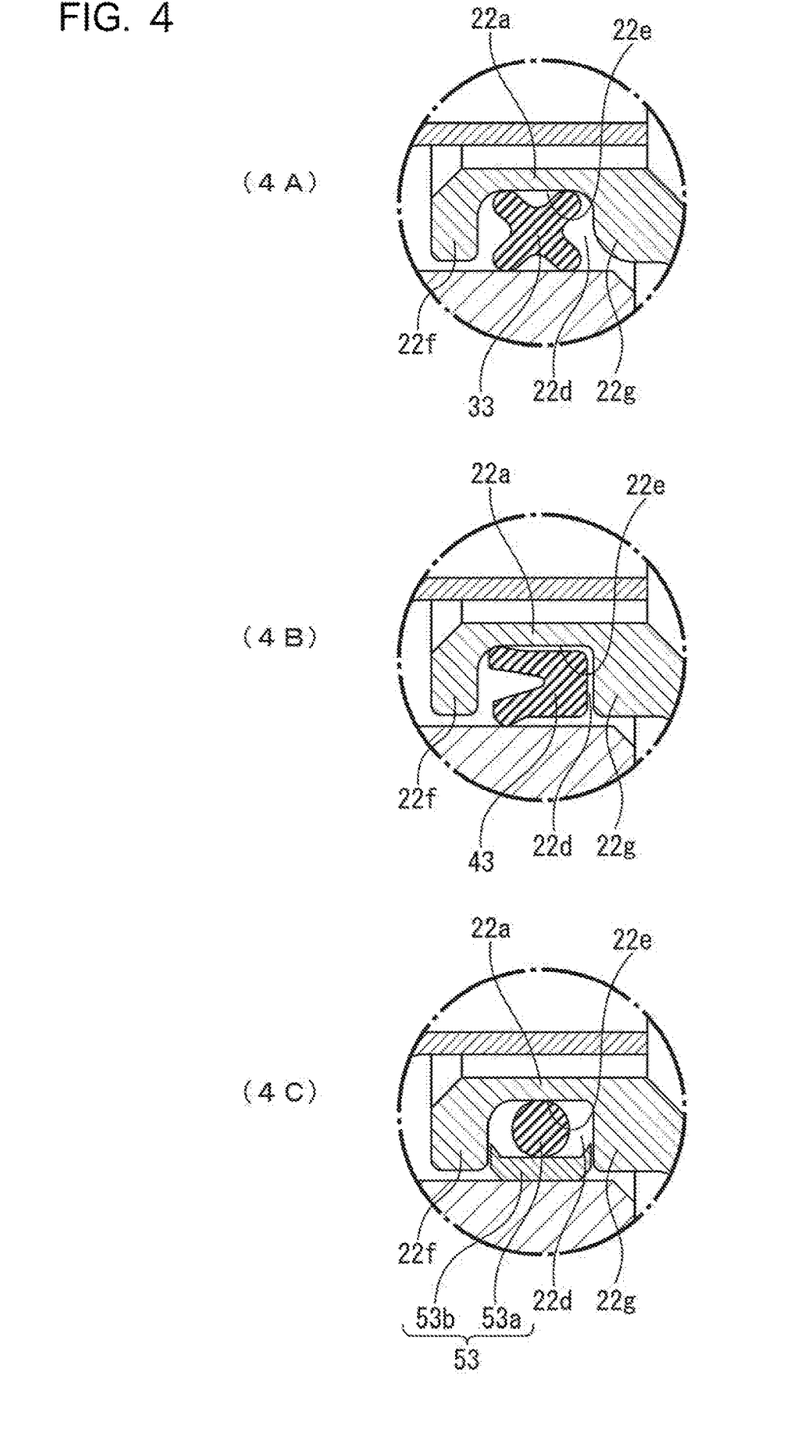
FIG. 4 shows a modification of the first to the third embodiments.

In the above embodiments, an O-ring is used as the seal member 23, but the present invention is not limited thereto. For example, as shown in FIG. 4, instead of an O-ring, an X-ring 33 (FIG. 4A), a U-ring 43 (FIG. 4B), or a V-ring (not shown) may be used as the seal member 23. The X-ring 33, the U-ring 43, and the V-ring can reduce sliding resistance compared to an O-ring, so even if the rotating-side sealing ring 11 and the stationary-side sealing rings 21, 31 are relatively displaced to the cases 22, 32, the stationary-side sealing rings 21, 31 are not restrained by the seal members 33, 43 from moving and can follow the movement of the rotating-side sealing ring 11 to provide reliable sealing properties.

Moreover, as shown in FIG. 4C, as a seal member 53, a combination seal including an O-ring 53a and a cap 53b may be used. The cap 53b is formed of a low friction material such as PTFE, so it is possible to reduce sliding resistance between the stationary-side sealing rings 21, 31 and the seal member 53. Thereby, even if the rotating-side sealing ring 11 and the stationary-side sealing rings 21, 31 are relatively displaced to the cases 22, 32, the stationary-side sealing rings 21, 31 are not restrained by the seal member 53 from moving and can follow the movement of the rotating-side sealing ring 11 to provide reliable sealing properties.

Further, the stationary-side sealing rings 21, 31 are formed by sintering SiC or the like, but may be formed of metallic materials such as stainless steel and SUJ2 (high carbon-chromium bearing steel). These metallic materials can further reduce friction than sintered material such as SiC. Thereby, by reducing friction of the stationary-side sealing rings 21, 31 themselves and combining them with the seal members 23, 33, 43, 53, the stationary-side sealing rings 21, 31 can further follow the movement of the rotating-side sealing ring 11 to provide reliable sealing properties.

REFERENCE SIGNS LIST 1 mechanical seal
2 rotating shaft
3 housing
10 rotating-side cartridge
11 rotating-side sealing ring
11a notch recess
12 sleeve
12a inner cylinder part
12b end wall
12c outer cylinder part
12p opening
13 cup gasket
20 stationary-side cartridge
21 stationary-side sealing ring
21a inner circumferential surface of stationary-side sealing ring (inner circumferential portion)
22 case
22a inner cylinder part
22b end wall
22c outer cylinder part
22d holding part
22e bottom wall
22f wall part
22g wall part
22p opening
23 seal member
24 biasing means
31 stationary-side sealing ring
32 case
32f claw part
33 seal member
43 seal member
53 seal member
S sliding face

The invention claimed is:

1. A mechanical seal assembly comprising:
a rotating-side sealing ring attached to a shaft;
a stationary-side sealing ring attached to a housing, wherein the rotating-side sealing ring and the stationary-side sealing ring slide relative to each other and seal between the housing and the shaft;
a case which is attached to the housing and which accommodates the stationary-side sealing ring; and
a seal member which is disposed between the case and the stationary-side sealing ring,
wherein:
the case includes a holding part which regulates the seal member from moving to both sides in an axial direction thereof;
the case has:
an opening facing the rotating-side sealing ring,
an outer cylinder part fixed to the housing, an end wall extending radially and inwardly from one end, opposite to the opening, of the outer cylinder part, and an inner cylinder part extending from an inner-diameter-side end of the end wall toward the opening in the axial direction;

the holding part is formed on an outer circumferential surface of the inner cylinder part, the holding part is an annular groove defined by a bottom wall, an annular wall part, and multiple claw parts, wherein the annular wall part and the multiple claw parts are erected from the bottom wall, and the holding part accommodates the seal member between the annular wall part and the claw parts on the bottom wall;

the seal member accommodated by the holding part contacts an inner circumferential surface of the stationary-side sealing ring and is regulated from moving to both sides in the axial direction by the annular wall part and the multiple claw parts.

2. The mechanical seal assembly according to claim 1, wherein the holding part further includes an axial gap between the seal member and itself.

3. The mechanical seal assembly according to claim 1, wherein a depth of the holding part is larger than a gap between the stationary-side sealing ring and the case.

4. The mechanical seal assembly according to claim 1, wherein a cross-sectional shape of the holding part is a trapezoidal shape which is narrow on an inner diameter side and is wide on an outer diameter side.

5. The mechanical seal assembly according to claim 1, wherein the inner circumferential surface of the stationary-side sealing ring has a same diameter along almost an entire axial length.

6. The mechanical seal assembly according to claim 1, wherein the inner circumferential surface of the stationary-side sealing ring is tapered in the axial direction.

7. The mechanical seal assembly according to claim 2, wherein a depth of the holding part is larger than a gap between the stationary-side sealing ring and the case.

8. The mechanical seal assembly according to claim 2, wherein a cross-sectional shape of the holding part is a trapezoidal shape which is narrow on an inner diameter side and is wide on an outer diameter side.

9. The mechanical seal assembly according to claim 2, wherein the inner circumferential surface of the stationary-side sealing ring has a same diameter along almost an entire axial length.

10. The mechanical seal assembly according to claim 2, wherein the inner circumferential surface of the stationary-side sealing ring is tapered in the axial direction.

11. The mechanical seal assembly according to claim 3, wherein a cross-sectional shape of the holding part is a trapezoidal shape which is narrow on an inner diameter side and is wide on an outer diameter side.

12. The mechanical seal assembly according to claim 3, wherein the inner circumferential surface of the stationary-side sealing ring has a same diameter along almost an entire axial length.

13. The mechanical seal assembly according to claim 3, wherein the inner circumferential surface of the stationary-side sealing ring is tapered in the axial direction.

14. The mechanical seal assembly according to claim 4, wherein the inner circumferential surface of the stationary-side sealing ring has a same diameter along almost an entire axial length.

* * * * *